3,753,975
Fritz Kaiser, Lampertheim, Hessen, Wolfgang Schaumann, Heidelberg, Kurt Stach, Mannheim-Waldhof, and Wolfgang Voigtlander, Viernheim, Hessen, Germany, assignors to Boehringer Mannheim GmbH, Mannheim, Germany
Filed Dec. 1, 1970, Ser. No. 94,212
Claims priority, application Germany, Dec. 15, 1969,
P 19 62 757.7
Int. Cl. C07c 173/00
U.S. Cl. 260—210.5                              8 Claims

ABSTRACT OF THE DISCLOSURE

Evomonoside ethers and/or esters of the formula

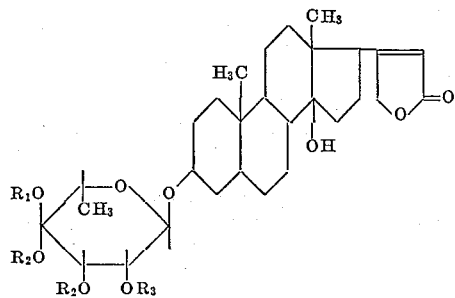

wherein one or two of the substituents $R_1$, $R_2$ and $R_3$ is lower alkyl or alkoxyalkyl or wherein the substituents $R_2$ and $R_3$ together represent a lower alkylidene radical, and the remaining substituents are hydrogen or acyl.

These evomonoside derivatives are highly effective therapeutic agents and are suitable for oral administration in the treatment of cardiac insufficiency.

---

The present invention is concerned with new evomonoside derivatives and with the preparation thereof and is also concerned with pharmaceutical compositions containing the new derivatives of evomonoside.

The new derivatives of evomonoside according to the present invention are compounds of the general formula:

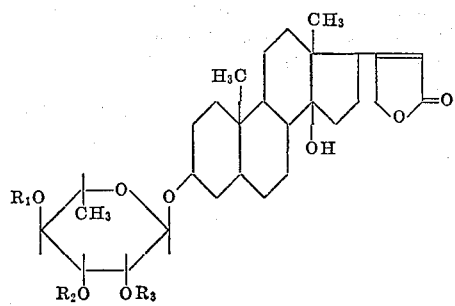

wherein one or two of the substituents $R_1$, $R_2$ and $R_3$ is lower alkyl or alkoxyalkyl or wherein the substituents $R_2$ and $R_3$ together represent a lower alkylidene radical, and the remaining substituents are hydrogen or acyl.

We have found that the new compounds of the above-given general formula have, in contradistinction to unsubstituted evomonoside, a surprisingly high resorption of 80–90% and are, therefore, outstandingly suitable for oral administration for the therapy of cardiac insufficiency.

The new compounds according to the present invention can be prepared by alkylating or ketalizing evomonoside in the usual manner and the product obtained is, if desired, then O-acylated.

The alkylation reaction can be carried out by reaction with appropriate alkylation agents, especially alkyl halides, dialkyl sulfates and diazoalkanes.

The O-acylation can be carried out with the use of all the conventional acylation agents used in sugar chemistry, for example, acid anhydrides or acid imidazolides, acid chlorides or the free acids and p-toluene-sulphochloride in the presence of a tertiary base, such as pyridine. The acyl radical is preferably that of a lower fatty acid, especially acetic acid.

As catalyst for the reaction of the hydroxyl groups in the 2' and 3'-position of the rhamnose with a ketone, there is preferably used a Lewis acid. Examples of catalysts which can be used include freshly melted zinc chloride, anhydrous copper sulfate, anhydrous calcium sulfate, ion exchangers and phosphorylated cellulose preparations. Instead of ketones, there can also be used the reactive derivatives thereof, for example, the lower dialkyl ketals.

The present invention also includes pharmaceutical compositions which contain at least one of the new evomonoside derivatives according to the present invention in admixture with a solid or liquid pharmaceutical diluent or carrier.

The following examples are given for the purpose of illustrating the present invention, all liquid ratios being by volume unless otherwise stated:

EXAMPLE 1

Evomonoside monomethyl ether 1 g. evomonoside is dissolved in 8 ml. dimethyl formamide, diluted with 12 ml. toluene and, after the addition of 0.3 g. barium hydroxide and 0.1 g. barium oxide, mixed dropwise at ambient temperature, while stirring and within the course of 60 minutes, with a solution of 0.4 ml. dimethyl sulfate in 12 ml. toluene. After stirring for 18 hours at ambient temperature, the reaction mixture is diluted with 150 ml. chloroform, filtered with suction, washed with chloroform, the filtrate mixed with 3 ml. pyridine and then evaporated in a vacuum. The residue is taken up with chloroform, shaken out with water and the chloroform phase, after drying over anhydrous sodium sulfate, evaporated in a vacuum. A multiplicative partition is carried out on the residue using the phase mixture chloroform-carbon tetrachloride-methanol-water 1:1:1:1. With the evaporation residue of the organic phase mixture carbon tetrachloride-ethyl acetate-methanol-water (3:1:2:2). The aqueous phase, after shaking out with chloroform, evaporation and crystallization of the residue from acetone, gives 440 mg. evomonoside monomethyl ether, with a melting point of 213–216° C.

EXAMPLE 2

Monoacetyl evomonoside monomethyl ether 1 g. of evomonoside monomethyl ether, prepared in the manner described in Example 1, is dissolved in 5 ml. pyridine, mixed with 130 mg. acetic anhydride and then left to stand for 24 hours at ambient temperature. Thereafter, the reaction mixture is diluted with water and shaken out with chloroform. The chloroform solution is washed with 2 N sulfuric acid and water, dried over anhydrous sodium sulfate and evaporated in a vacuum. The crude product thus obtained is dissolved in benzene containing 10% ethyl acetate poured over 50 g. of silica gel and fractionated using successive volumes of benzene, each of a successively higher ethyl acetate concentration. From the 1:1 benzene-ethyl acetate fractions, there is obtained, after recrystallization of the evaporation residue from chloroform-petroleum ether, 350 mg. monoacetyl evomonoside monomethyl ether, with a melting point of 163–167° C.

EXAMPLE 3

Evomonoside dimethyl ether 1 g. evomonoside dissolved in 8 ml. dimethyl formamide and 4 ml. toluene is, after the addition of 0.9 g. barium hydroxide and 0.3 g. barium oxide, reacted, in the manner described in Example 1, with 1.2 ml. dimethyl sulfate in 8 ml. toluene and the reaction mixture then worked up as in Example 1. The crude product obtained is subjected to a multiplicative partition with the phase mixture carbon tetrachloride-ethyl acetate-methanol-water (3:1:2:2). The organic phase is evaporated and the residue is fractionated with benzene-ethyl acetate over 50 g. silica gel. From the fractions containing 20–35% ethyl acetate, there is obtained, by recrystallization of the evaporation residue from chloroform-petroleum ether, 360 mg. evomonoside dimethyl ether, with a melting point of 112–114° C.

EXAMPLE 4

Evomonoside monoethyl ether 1 g. evomonoside is dissolved in 8 ml. dimethyl formamide, mixed with 0.58 g. barium hydroxide and 0.2 g. barium oxide and, while stirring, 0.85 ml. diethyl sulfate are added dropwise at 35° C. Thereafter, the reaction mixture is stirred for 4 hours at 35° C. and subsequently worked up in the manner described in Example 1. With the crude product obtained, there is carried out a countercurrent partition with the phase mixture carbon tetrachloride-chloroform-methanol-water (1:1:1:). After recrystallization of the evaporation residue of the organic phase from chloroform-ether-petroleum ether, there are obtained 290 mg. evomonoside monoethyl ether, with a melting point of 119–122° C.

EXAMPLE 5

Evomonoside mono-(ethoxymethyl) ether 1 g. evomonoside is dissolved in 10 ml. dimethyl formamide and 10 ml. dimethyl-aniline, mixed with 1.25 g. ethyl chloromethyl ether and warmed to 40° C. for 24 hours. The reaction mixture is diluted with 250 ml. water and then extracted with petroleum ether and chloroform. The chloroform extract is evaporated in a vacuum and fractionated with petroleum ether, benzene and chloroform-methanol (1:1) over 100 g. aluminum oxide. The residue of the chloroform-methanol (1:1) fraction is separated over 50 g. silica gel with benzene-ethyl acetate. The fractions with 60% ethyl acetate yield, after evaporation and crystallization of the residue from chloroform-ether-petroleum ether, 380 mg. evomonoside mono (ethoxymethyl) ether, with a melting point of 96–99° C.

EXAMPLE 6

Isopropylidene-evomonoside 1 g. evomonoside is dissolved in 10 ml. chloroform-methanol (1:1 by volume) and 100 ml. acetone, mixed with 10 g. anhydrous zinc chloride and warmed to 40° C. for 4 days. Thereafter, the reaction mixture is diluted with water, shaken out with chloroform, evaporated in a vacuum and, for the separation of unreacted evomonoside, subjected to a multiplicative partition with the phase mixture chloroform-benzene-methanol-water (3:1:2:2). The organic phase is evaporated and the residue crystallized from chloroform-ether-petroleum ether. There are obtained 750 mg. isopropylidene-evomonoside, with a melting point of 195–198° C.

EXAMPLE 7

Isobutylidene-evomonoside 1 g. evomonoside is dissolved in 10 ml. chloroform-methanol (1:1) and 100 ml. methyl ethyl ketone, mixed with 10 g. anhydrous zinc chloride and then warmed to 40° C. for 3 days. Thereafter, the reaction mixture is worked up in the manner described in Example 6 and the crude product obtained subjected to a multiplicative partition with the phase mixture chloroformcarbon tetrachloride-methanol-water (1:1:1:1). The organic phase is evaporated and the residue is crystallized from chloroformether-petroleum ether. There are obtained 640 mg. isobutylidene-evomonoside, with a melting point of 117–120° C.

The compounds of this invention are useful in the preparation of medicinal agents because of their cardiopharmacodynamic actions.

Usually the evomonoside ethers of the invention are administered orally, for instance in the form of tablets or pills. The new compounds can also be administered parenterally, for instance, by intravenous injection. For this purpose, they are employed in the form of injectable solutions in water or isotonic salt solutions.

The evomonoside ethers according to the present invention are preferably not used as such in undiluted form but are diluted with suitable diluting agents as they are conventionally used as pharmaceutical carriers. Such dilution allows better and more economical use to be made thereof.

For making tablets, pills and other solid forms for medication, uniform dispersion of the active compound throughout the carrier is required. Such a fine and uniform dispersion is achieved for instance by intimately mixing and milling the evomonoside ethers according to the present invention with a solid pulverulent diluent and, if required, with tableting adjuvants to the desired degree of fineness. One may also impregnate the finely pulverized, solid carrier, while milling, with a solution of the active compound in water or a suitable solvent and removing the solvent during such milling.

As solid pharmaceutical carriers, various inert pulverulent distributing agents, as they are conventionally used in the pharmaceutical industry, may be employed.

Solid diluents which are admixed to the active compounds, especially when preparing tablets, pills and other compressed forms, are the commonly used diluting agents, such as cornstarch, dextrose, lactose, sugar and the like. For making tablets and other compressed medication forms, binders such as pectins, gelatin, gum arabic, methylcellulose, yeast extract, agar, tragacanth, and lubricants such as magnesium stearate, calcium stearate, stearic acid, talc and the like are used.

The amount of evomonoside ether present in such preparations may, of course, vary. It is necessary that the active ingredient be contained therein in such an amount that a suitable dosage will be ensured. Ordinarily, the preparations should not contain less than about 0.1 mg. of the active evomonoside ether. The preferred amount in orally administered preparations such as tablets, pills and the like, is between about 0.2 mg. and 1.0 mg. per day.

The doses to be administered vary according to the type of action desired, i.e., whether said action is to be digitalization or maintenance. It is, of course, understood that the physician will determine the proper amounts to be given to a patient depending upon the symptoms to be alleviated and the patient's condition and that the doses given above are by no means limiting the new evomonoside ethers to such dosages.

In order to establish the effectiveness of the compounds of the invention, i.e., their improved absorption rate, the compounds of the invention and evomonoside as comparison compound were administered both intravenously and via the oral route and the absorption determined coincident with the determination of the pharmacological activity.

The criterion which was selected for measuring the effectiveness of the compound was the length of the period of time elapsing following intraduodenal and intravenous injection of the tested compounds in the guinea pig before ventricular extrasystoles and cardiac arrest occurred.

Test procedure.—Guinea pigs were used which had been subjected to urethane anesthesia. A canula was fixedly inserted into the animals' duodenum above the bile duct juncture. The test compounds were intraduodenally injected in the amounts set forth in the table which follows. In each case the test compound was given in 10 ml./kg. of an aqueous solution containing 1% methylcellulose and 5% dimethylacetamide. The animals' EKG was observed on an oscilloscope and it was determined at what exact time the first ventricular extrasystoles occurred. If, for a period of 4 seconds, no EKG could be read, it was considered that cardiac arrest had occurred. The results are set out in the following table:

| Active compound | Guinea pigs | |
| --- | --- | --- |
| | Intra-duodenal, mg./kg. | Minutes until death |
| Evomonoside | 3 | >120 |
| Evomonoside monomethyl ether | 3 | 14 |
| Monoacetyl-evomonoside monomethyl ether | 2 | 16 |
| Evomonoside dimethyl ether | 3 | 19 |
| Evomonoside monoethyl ether | 3 | 26 |
| Evomonoside mono-(ethoxymethyl) ether | 3 | 18 |
| Isopropylidene evomonoside | 2 | 32 |
| Isobutylidene evomonoside | 3 | 26 |

As can be seen from the table, the death of the animals occurs after an appreciably shorter time with the new compounds than with evomonoside, i.e. the ethers are resorbed better and more quickly than the unsubstituted heart glycoside.

It will be appreciated that the instant specification and examples are set forth by way of illustration and not limitation and that various modifications and changes may be made without departing from the spirit and scope of the present invention.

What is claimed is:

1. Evomonoside derivatives of the general formula:

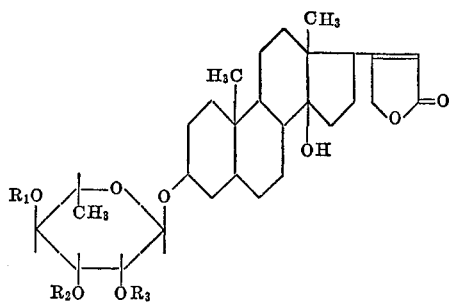

wherein one or two of the substitutents $R_1$, $R_2$ and $R_3$ is lower alkyl or lower alkoxy-lower alkyl or wherein the substituents $R_2$ and $R_3$ together represent a lower alkylidene radical, and the remaining substituents are hydrogen or acetyl.

2. Evomonoside derivative according to claim 1 wherein such derivative is evomonoside monomethyl ether.

3. Evomonoside derivative according to claim 1 wherein such derivative is monoacetyl-evomonoside monomethyl ether.

4. Evomonoside derivative according to claim 1 wherein such derivative is evomonoside dimethyl ether.

5. Evomonoside derivative according to claim 1 wherein such derivative is evomonoside mono-(ethoxymethyl) ether.

6. Evomonoside derivative according to claim 1 wherein such derivative is isopropylidene evomonoside.

7. Evomonoside derivative according to claim 1 wherein such derivative is evomonoside monoethyl ether.

8. Evomonoside derivative according to claim 1 wherein such derivative is isobutylidene evomonoside.

References Cited

UNITED STATES PATENTS 3,458,628   7/1969   Kaiser et al. _____ 260—210.5

LEWIS GOTTS, Primary Examiner

J. R. BROWN, Assistant Examiner

U.S. Cl. X.R.

424—182

CERTIFICATE OF CORRECTION

Patent No. 3,753,975　　　　　　　　　Dated August 21, 1973

Inventor(s) Fritz Kaiser et al.

It is certified that error appears in the above-identified patent and that said Letters Patent are hereby corrected as shown below:

Col. 2, line 47, after "organic phase" insert -- , there is carried out a countercurrent partition with the phase --.

Signed and sealed this 7th day of January 1975.

(SEAL)
Attest:

McCOY M. GIBSON JR.　　　　　　　　C. MARSHALL DANN
Attesting Officer　　　　　　　　　Commissioner of Patents

UNITED STATES PATENT OFFICE
CERTIFICATE OF CORRECTION

Patent No. 3,753,975  Dated August 21, 1973

Inventor(s) Fritz Kaiser et al.

It is certified that error appears in the above-identified patent and that said Letters Patent are hereby corrected as shown below:

The term of this patent subsequent to

August 21, 1990, has been disclaimed.

Signed and Sealed this

Twenty-seventh Day of July 1976

[SEAL]

Attest:

RUTH C. MASON
*Attesting Officer*

C. MARSHALL DANN
*Commissioner of Patents and Trademarks*